Dec. 18, 1956 G. J. YOUNG 2,774,730
NEUTRONIC REACTOR HAVING A FLATTENED ACTIVITY CURVE
Filed Sept. 5, 1944 10 Sheets-Sheet 1

Inventor:
Gale J. Young
By:
Robert A. [Saunders]
Attorney.

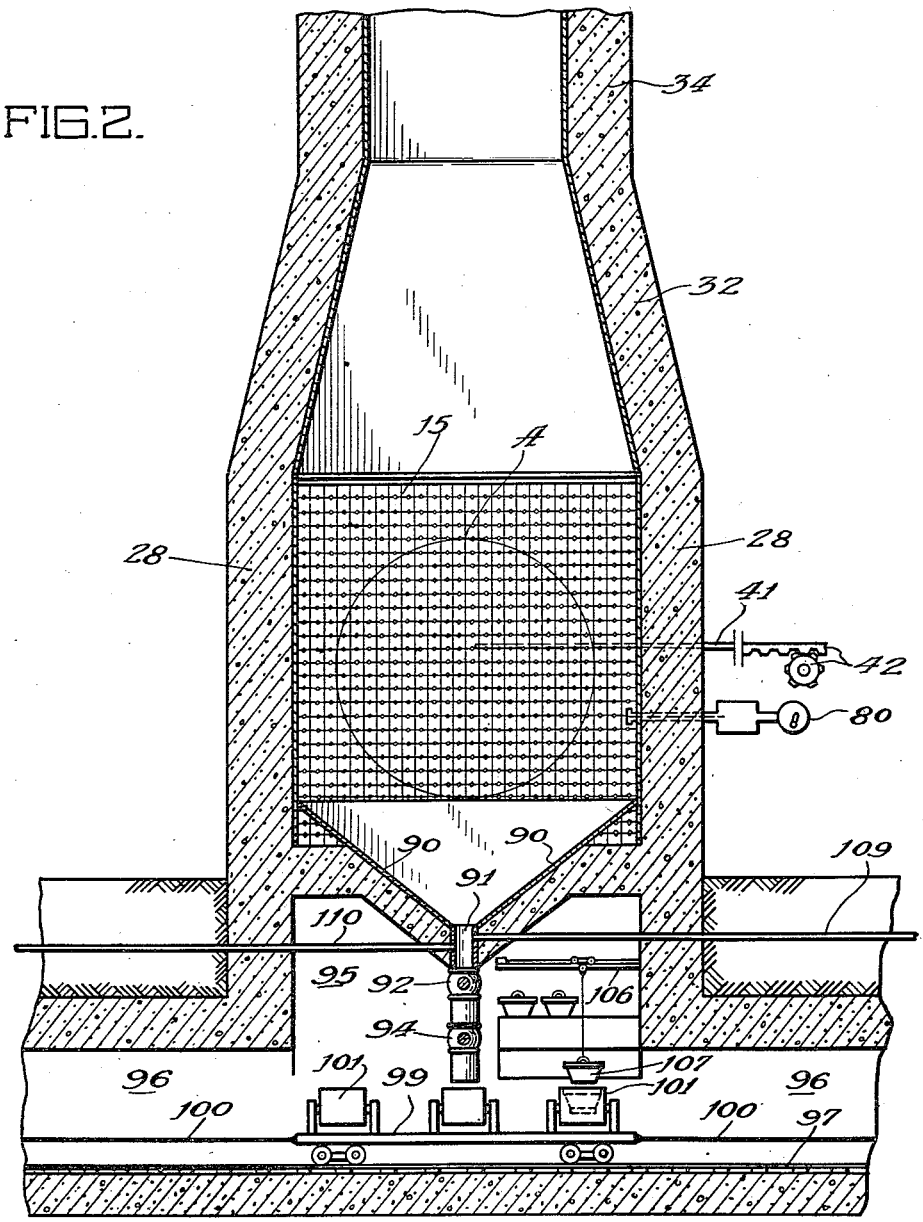

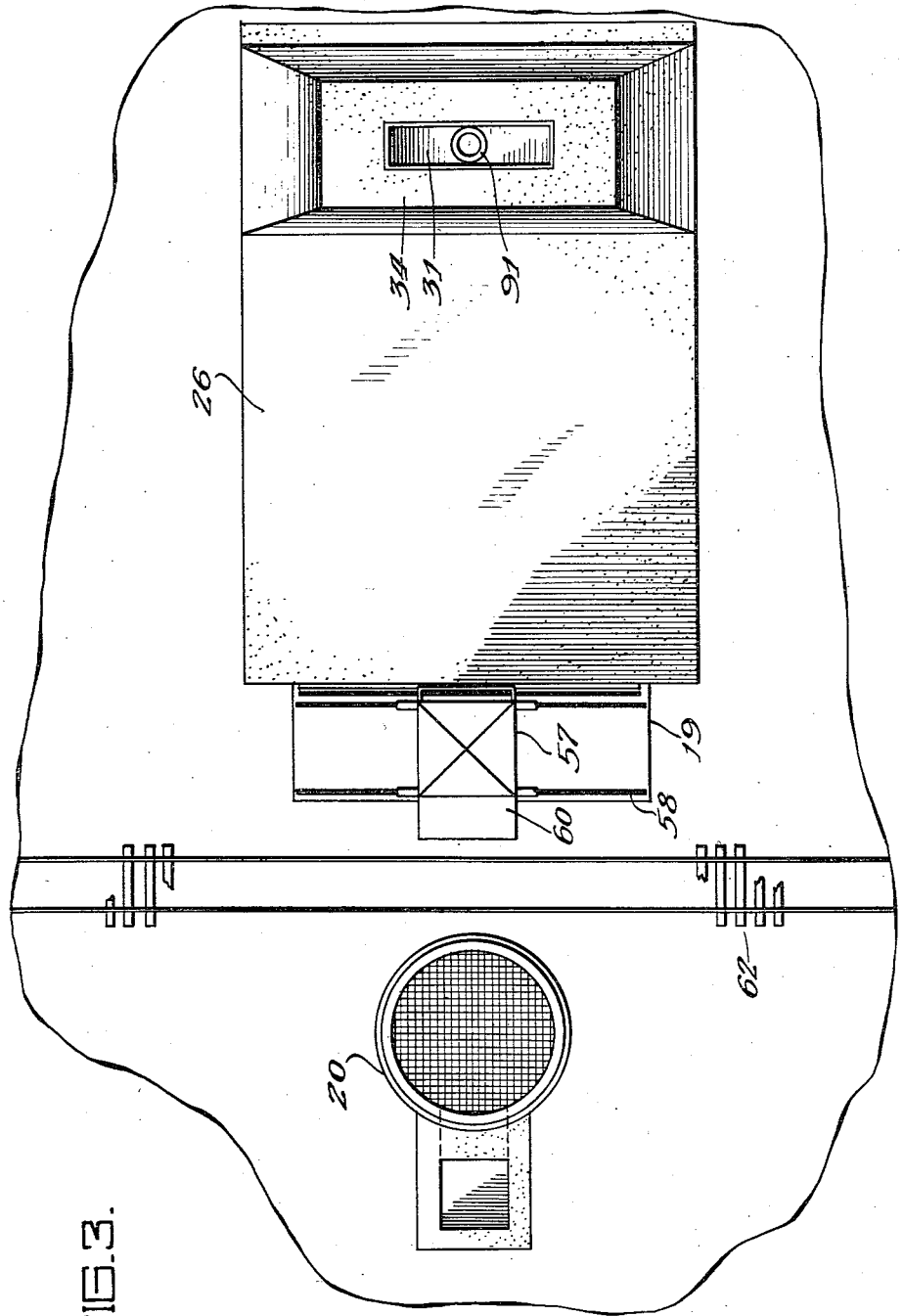

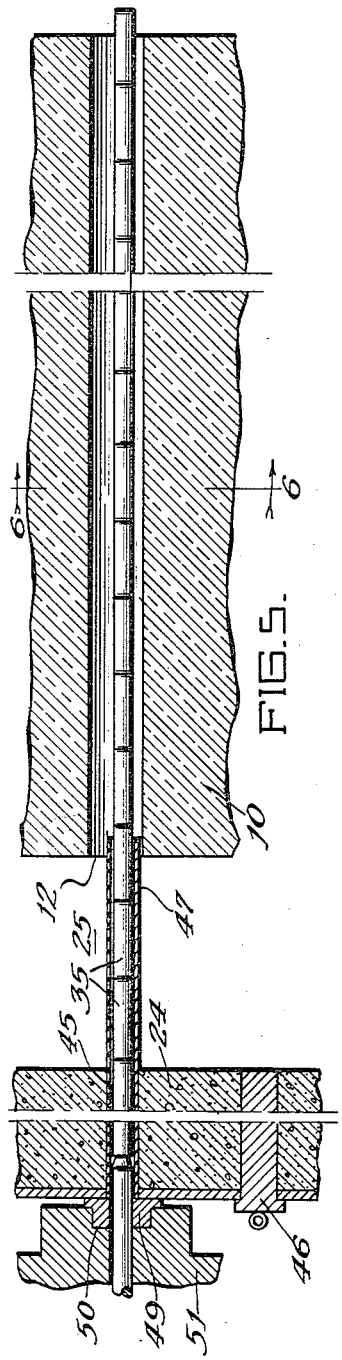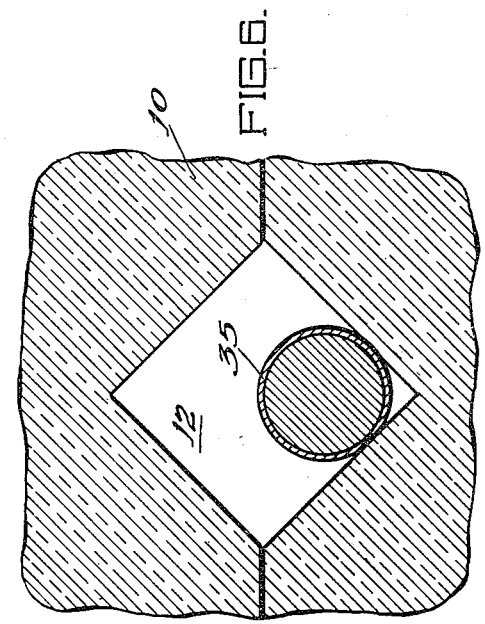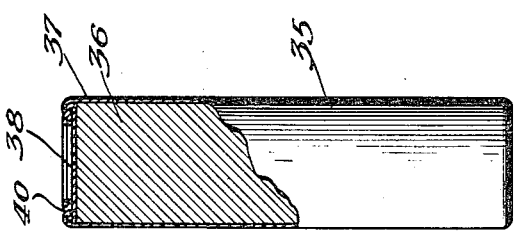

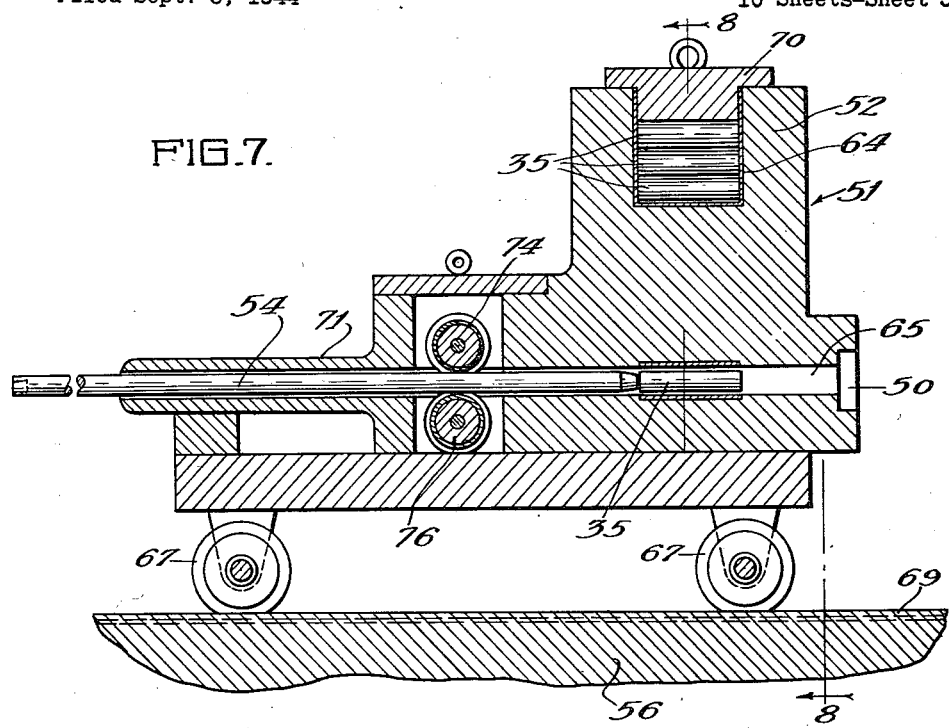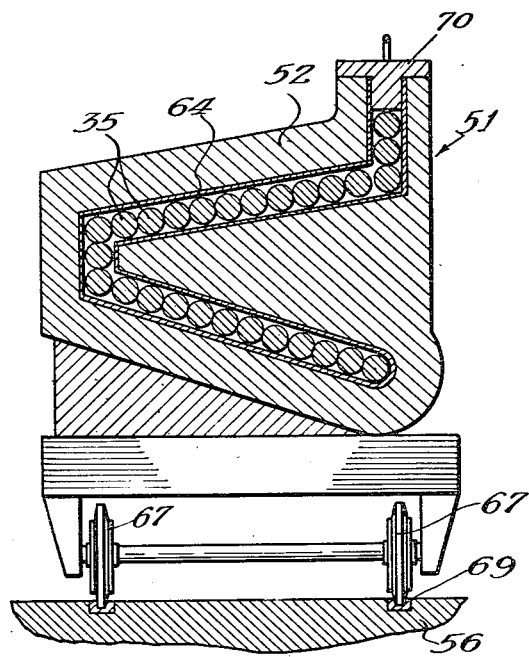

Dec. 18, 1956 — G. J. YOUNG — 2,774,730
NEUTRONIC REACTOR HAVING A FLATTENED ACTIVITY CURVE
Filed Sept. 5, 1944 — 10 Sheets-Sheet 6
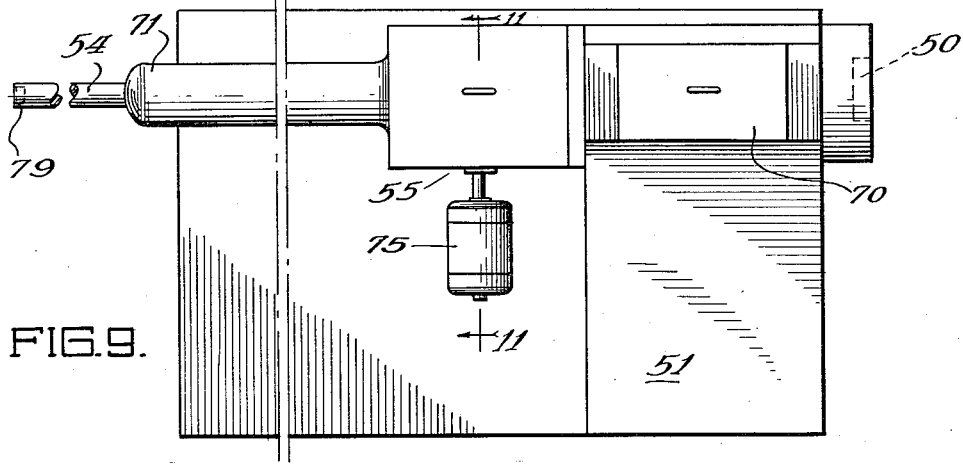
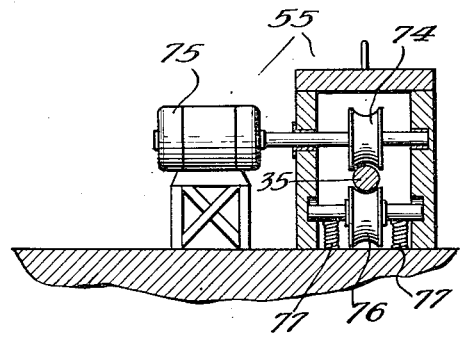
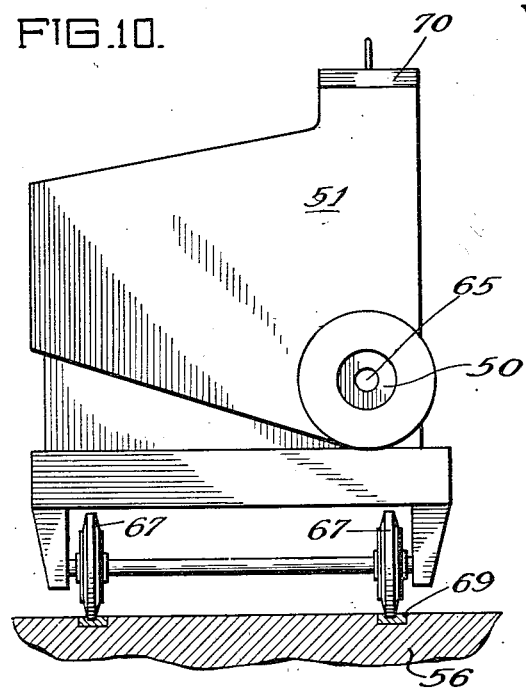
Inventor:
Gale J. Young
By:
Attorney Dec. 18, 1956 G. J. YOUNG 2,774,730
NEUTRONIC REACTOR HAVING A FLATTENED ACTIVITY CURVE
Filed Sept. 5, 1944 10 Sheets-Sheet 7

Inventor:
Gale J. Young
By:
Attorney

Dec. 18, 1956  G. J. YOUNG  2,774,730
NEUTRONIC REACTOR HAVING A FLATTENED ACTIVITY CURVE
Filed Sept. 5, 1944  10 Sheets-Sheet 9

Inventor:
Gale J. Young
By:
Robert A. Lavender
Attorney

United States Patent Office 2,774,730
Patented Dec. 18, 1956

2,774,730

NEUTRONIC REACTOR HAVING A FLATTENED ACTIVITY CURVE

Gale J. Young, Chicago, Ill., assignor to the United States of America as represented by the United States Atomic Energy Commission Application September 5, 1944, Serial No. 552,730

1 Claim. (Cl. 204—193)

This invention is concerned with a new type of neutronic reactor and is especially directed to a type of reactor capable of producing a maximum of a fissionable isotope such as the isotope of element 94 having a mass of 239. Chain reactors of this type usually comprise a neutron moderator or slowing material capable of slowing fast neutrons to slow or approximately thermal energies, together with a fissionable material, such as uranium. Neutrons absorbed in the uranium isotope $U^{235}$ give off fast neutrons from the fission of the $U^{235}$ nucleus. These fast fission neutrons are slowed down and a part of them used for evolution of further neutrons.

Such reactors have been constructed with substantially constant volume ratios of uranium to moderator throughout. Consequently the number of neutrons present per unit volume in the central volume of the neutronic reactor is substantially higher than the number of neutrons present per unit volume in an exterior portion of the reactor.

In accordance with the present invention it has been found that certain advantages may be secured by modifying the construction of a neutronic reactor so that the neutron reproduction factor of one portion of the reactor differs substantially from the reproduction factor in another area. Frequently it is desirable to modify the construction of the reactor so that neutron density (neutrons present per unit volume) is substantially the same throughout a large volume of the reactor. By this means it is possible to secure a more uniform distribution of heat throughout the reactor and thus it is possible to cool the reactor and remove evolved heat therefrom more uniformly and to permit the operation of the reactor at higher overall power output. This type of construction is particularly advantageous where it is desired to increase the rate of production of $94^{239}$, as will be hereinafter more fully explained.

Natural uranium may be used in the reaction and contains the isotopes $92^{238}$ and $92^{235}$ in the ratio of approximately 139 to 1. Hereinafter in the specification and the claims the term uranium is to be understood as referring to uranium and its chemical compositions of normal isotopic content, unless otherwise indicated by the context.

In a self-sustaining chain reaction of uranium with slow neutrons, $92^{238}$ is converted by neutron capture to the isotope $92^{239}$. The latter is converted by beta decay to $93^{239}$ and this $93^{239}$ in turn is converted by beta decay to the transuranic element $94^{239}$. By thermal neutron capture, $92^{235}$ on the other hand, undergoes nuclear fission to release energy appearing as heat, gamma and beta radiation, together with the formation of fission fragments appearing as radioactive isotopes of elements of lower mass numbers, and with the release of secondary neutrons.

The secondary neutrons thus produced by the fissioning of the $92^{235}$ nuclei have a high average energy, and must be slowed down to thermal energies in order to be in condition to cause slow neutron fission in other $92^{235}$ nuclei. While some of the secondary neutrons are absorbed by the uranium isotope $92^{238}$ leading to the production of $94^{239}$, and by other materials, enough can remain to sustain the chain reaction.

Under these conditions, the chain reaction will supply not only the neutrons necessary for maintaining the neutronic reaction, but also will supply the neutrons for capture by the isotope $92^{238}$ leading to the production of $94^{239}$.

As $94^{239}$ is a transuranic element, it can be separated from the unconverted uranium by chemical methods, and as it is fissionable in a manner similar to the isotope $92^{235}$, it is valuable for enriching natural uranium for use in other chain reacting systems of smaller overall size. The fission fragments are also valuable as sources of radioactivity.

The ratio of the number of secondary neutrons produced by the fissions to the original number of primary neutrons producing the fissions in a chain reacting system of infinite size using specific materials is called the reproduction factor of the system and is denoted by the symbol K. When K is made sufficiently greater than unity to create a net gain in neutrons and the system is of a (practical) size such that this gain is not entirely lost by leakage from the exterior surface of the system, then a practical self-sustaining chain reacting system producing power by nuclear fission of natural uranium is obtained. The neutron reproduction ratio in a system of finite size differs from K by the exterior neutron leakage factor, and must also be sufficiently greater than unity to permit the neutron density to rise exponentially. Such rise will continue indefinitely if not controlled at a desired density corresponding to a desired power output.

To more fully understand the operation of a neutronic reactor, the following brief explanation is given. During the interchange of neutrons in a system comprising bodies of uranium of any size disposed in a slowing medium or moderator, neutrons may be lost in four ways, by absorption in uranium isotope $U^{238}$, by absorption in the slowing down material or moderator, by absorption in impurities or neutron absorbers present in the system, and by leakage out of the system. The neutrons which are not lost by one of the above methods are available for fission of $U^{235}$ or similar isotope which produces more neutrons. Since more than one neutron is produced for each neutron consumed in a fission a chain reaction may be secured where proper precautions are taken to prevent the above losses from becoming excessive.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates the relatively stable isotope $94^{239}$. It is not to be confused with absorption or capture of neutrons by impurities, referred to later. Neutron resonance absorption in uranium may take place either on the surface of the uranium bodies in which case the absorption is known as surface resonance absorption, or it may take place further in the interior of the uranium body, in which case the absorption is known as volume resonance absorption. Volume resonance absorption is due to the fact that some neutrons make collisions inside the uranium body and may thus arrive at resonance energies therein. After successfully reaching thermal energies, about 40 percent of the neutrons are also subject to capture by $U^{238}$ without fission, leading to the production of $94^{239}$.

It is possible by proper physical arrangement of the materials in the moderator to control and to effectively decrease the amount of uranium resonance absorption.

By the use of a light element such as graphite, relatively few collisions are required to slow the neutrons to thermal energies, thus decreasing the probability of a neutron being at a resonance energy as it enters a uranium atom. During the moderating process, however, neutrons are diffusing through the slowing medium over random paths and distances so that the uranium is not only exposed to thermal neutrons but also to neutrons of energies varying between the energy of fission and thermal energy. Neutrons at uranium resonance energies will, if they enter uranium at these energies, be absorbed on the surface of a uranium body whatever its size, giving rise to surface absorption. However, any substantial change of overall surface of the same amount of uranium will change surface resonance absorption. Thus the volume ratio of moderator to uranium will control resonance absorption losses of neutrons in the uranium, and this fact can be utilized to change the K factor of the reactor. The uranium may be placed in the system in the form of spaced uranium masses or bodies of substantial size, either of metal, oxide, carbide, or other compounds or combinations thereof. The uranium bodies may be in the form of layers, rods or cylinders, cubes or spheres, or other shapes dispersed throughout the graphite or other moderator, preferably in some geometric pattern. The term geometric is used to mean any pattern or arrangement wherein the uranium bodies are distributed in the graphite with at least a roughly uniform spacing or with a roughly systematic non-uniform spacing, and are at least roughly uniform in size and shape or are systematic in variations of size or shape to produce a volume pattern conforming to a generally symmetrical system. If the pattern is a repeating or rather exactly regular one, the structure may be conveniently described as a lattice structure. Optimum conditions are obtained when natural uranium is used by using metal spheres, but short cylinders are substantially equivalent.

The K factor of a mixture of fine metallic uranium particles suspended more or less uniformly in graphite, assuming both of them to be theoretically pure, has been calculated to be about .785. On the other hand actual K factors as high as 1.08 have been obtained using aggregations of natural metallic uranium into bodies of substantial size dispersed in the moderator in various geometries, and with as pure materials as is presently possible to obtain in commercial amount and with completely pure uranium and carbon a K factor of 1.10 may be secured in the absence of another neutron absorber. By using lattices having different volume ratios any K factor between unity and about 1.10 can be obtained. Where heavy water ($D_2O$) is used as a moderator K factors as high as 1.3 may be secured and when the moderator is beryllium a K factor up to 1.18 may be obtained. Somewhat lower K factors are obtainable using uranium compounds.

The thermal neutrons are also subject to capture by the moderator. While carbon has a relatively low capture cross-section for thermal neutrons, an appreciable fraction of thermal neutrons (usually about 10 percent of the neutrons present in the system under best conditions with graphite) is lost by capture in the moderator during diffusion therethrough. This means that when volume ratios are changed, the absorption in the moderator will also be changed, as the neutrons will have path lengths varying, before entering uranium, in accordance with the volume ratio used, and the longer time the neutrons remain in the graphite, the higher the probability will be that they will be captured by the moderator. By proper adjustment of the size of the uranium aggregates it is possible to minimize both absorption of neutrons of the moderator and resonance absorption by $U^{238}$.

The neutronic chain reaction referred to can be made self-sustaining in a device known as a neutronic reactor wherein uranium bodies are dispersed in an efficient neutron slowing medium or moderator, when the reactor is made to be just above a critical size where the rate of neutron generation inside the reactor is slightly greater than the rate of neutron loss from the exterior of the reactor. Under these conditions, a self-sustaining nuclear chain reaction can be obtained within the reactor having any neutron density desired, up to infinity. However, to prevent destruction of the reactor, the amount of heat evolved must be controlled, and then removed in order to provide a stable temperature in the reactor at some predetermined and controlled operating level. As increasing the number of fissions increases the number of neutrons present to produce $92^{239}$ converting to $94^{239}$ by successive beta decay, the production of $94^{239}$ is accelerated by operating the reactor at high neutron density levels.

A stable temperature in an uncooled neutronic reactor composed entirely of moderator and fissionable material such as, for example, graphite and uranium metal, can only be attained at a relatively low power output as the heat generated can be dissipated only by conduction out of the reactor. Higher power outputs with greater production of $94^{239}$ require additional heat removal.

However, proper heat removal is complicated by the fact that in a neutronic reactor where the uranium bodies are in a lattice of uniform size and spacing, nuclear fission and heat generation due to the chain reaction are both greatest at the center of the reactor and least at its edges, both activities following a cosine curve distribution across the reactor, as will be pointed out later. Such a centrally peaked activity limits the total power at which the reactor can operate, to a power where the more central uranium bodies are operating at a maximum permissible temperature when adequate cooling is applied to the central portions of the reactor. In other words, the temperature of the uranium at the center of the reactor is a controlling factor. The total power output, under these circumstances, can therefore be only the average power developed in the reactor when the uranium at the center of the reactor has reached the maximum permissible temperature. By flattening the reactor activity curve across the reactor, then the central peak power can still remain at the maximum permissible value and the total power output of the reactor can be increased.

It is the principal object of my invention to so construct a cooled neutronic reactor that the maximum heat generation due to nuclear fission is spread out over a large volume of the reactor so that operating power can be increased without damage to the reactor.

Flattening of the reactor activity curve across the reactor is also advantageous in that the local heat generation is directly proportional to the local absorption of neutrons by $U^{238}$. In other words $94^{239}$ eventually is formed in the uranium bodies in accordance with the neutron density to which the bodies are exposed. Flattening the reactor activity curve across the reactor permits a greater number of uranium bodies to be subjected to high neutron densities.

It is another object of my invention to construct a neutronic reactor in which the production of $94^{239}$ and other products of the neutronic reaction can be accelerated and made more uniform throughout the reactor.

The flattening of the reactor activity curve may be effected by constructing a reactor in which the K factor varies generally from interior to exterior to compensate for variation in leakage and thereby to secure a substantially uniform reproduction ratio throughout a major portion of a reactor of finite dimensions.

As volume ratios can control the K factor of a reactor structure, lattices having different volume ratios can provide different K factors in a neutronic reactor. Ordinarily, neutronic reactors have lattices in which uranium bodies of uniform size and shape are placed in the moderator with uniform spacing throughout, and the bodies are generally of substantially uniform size. This results, as stated above, in a reactor having a peaked central neutron density, and in consequence, a peaked central heat production.

However, by using different lattices in different concentric zones of the reactor, and particularly by using a lattice having the lowest K factor in the central zone of the reactor, the reactor activity curve can be appreciably flattened across the reactor, resulting, for the same total power, in lowering the relative central peak neutron density and in raising the neutron density in outer zones. In consequence, the activity is spread more uniformly throughout the reactor. Cooling becomes more efficient and when the central uranium bodies are raised to their maximum permissible operating temperature, the total power output of the reactor with a flattened activity curve across the reactor will be much larger than the total power output of the reactor with the peaked activity curve across the reactor, for the same central uranium body temperature. Moreover the amount of uranium exposed to high neutron densities is increased, and the yield of $94^{239}$ is thereby increased.

Other objects and advantages of my invention may be more clearly understood by reference to the following description and the attached drawings which illustrate, as an example, one form of reactor in which my invention may be used. This example is not to be taken as limiting, as my invention, within the scope of the appended claims, can be used in any type of neutronic reactor wherein uranium bodies or other fissionable bodies are disposed in a moderating medium.

In the drawings:

Fig. 2 is a cross-sectional view, partly in elevation, taken as indicated by the line 2—2 in Fig. 1.

Fig. 3 is a plan view of the system shown in Figs. 1 and 2.

Fig. 4 is a longitudinal sectional view partly in elevation of a jacketed slug.

Fig. 5 is a longitudinal sectional view, partly in elevation of a horizontal channel during a loading and unloading operation.

Fig. 6 is a cross-sectional view taken as indicated by the line 6—6 in Fig. 5.

Fig. 7 is a longitudinal sectional view, partly in elevation, of one form of loading device.

Fig. 8 is a view partly in section and partly in elevation taken as indicated by the line 8—8 in Fig. 7.

Fig. 9 is a top plan view of the loading device shown in Figs. 7 and 8.

Fig. 10 is an end view of the loading device shown in Figs. 7, 8 and 9.

Fig. 11 is a view partly in section and partly in elevation of a friction drive used in the loading device.

Figure 17:
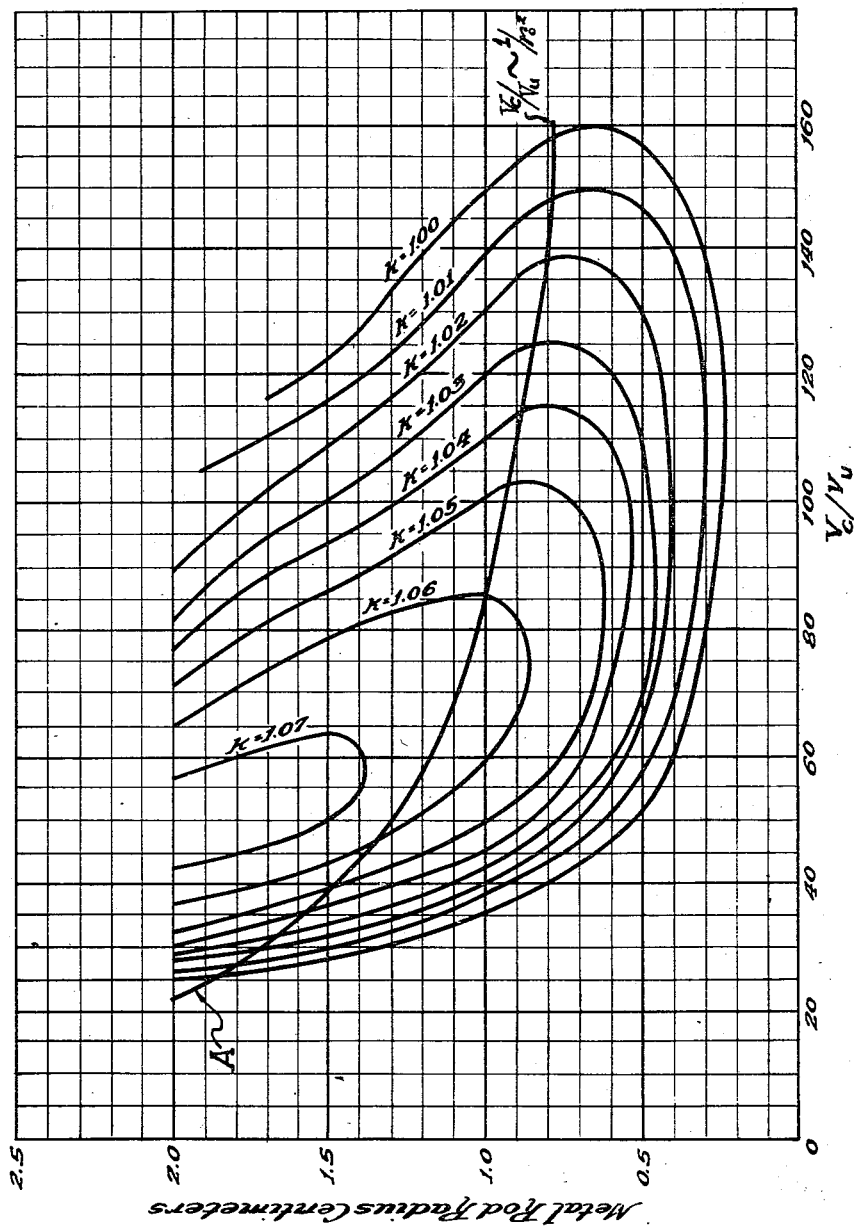
Figure 18:
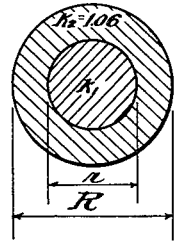
Figure 20:
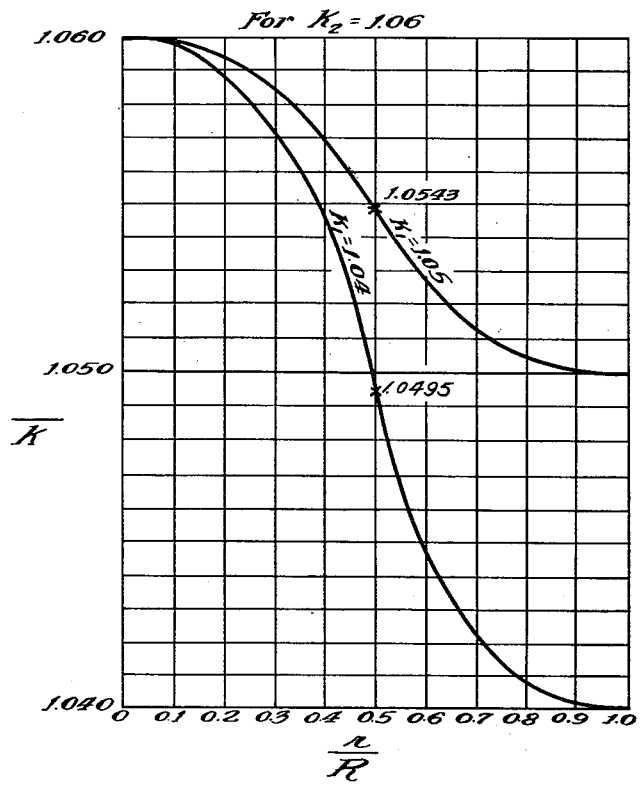
Figure 19:
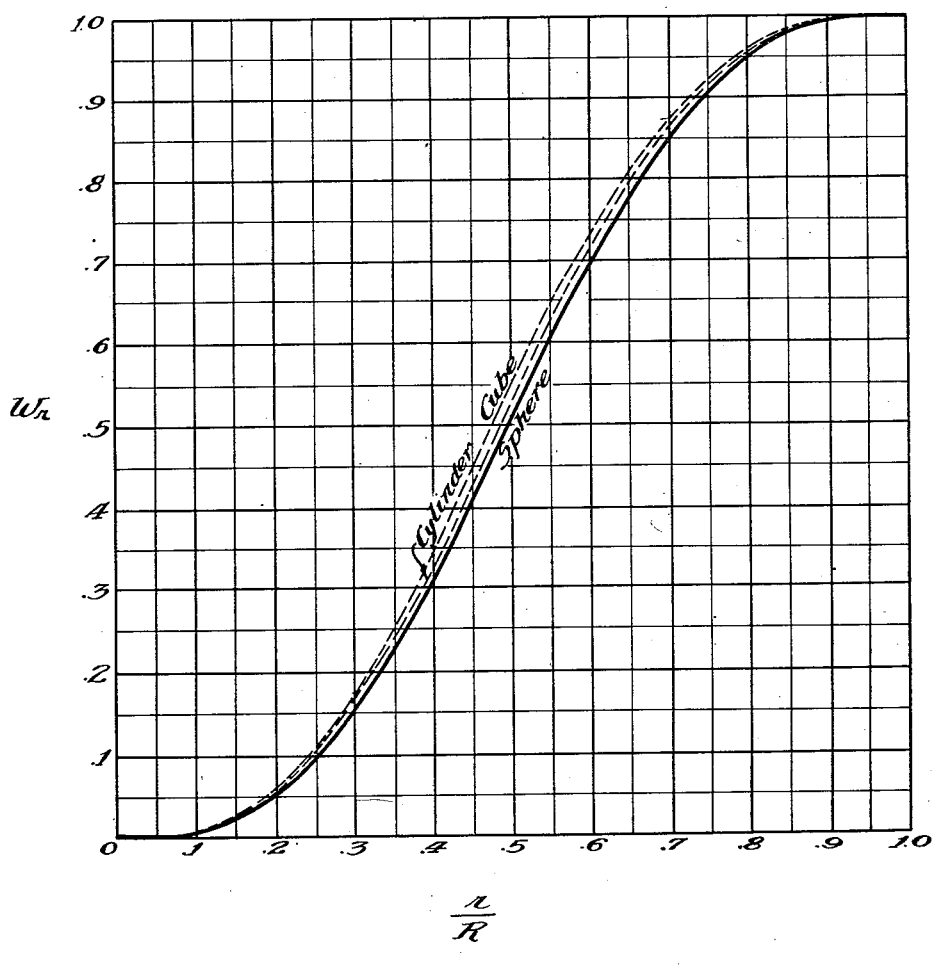

Figs. 13 to 16, inclusive, are diagrams of a loaded channel showing how the volume ratios of moderator to uranium can be varied;

Fig. 17 is a diagram giving K factor values for different volume ratios of graphite to uranium when uranium metal rods of different radii are used;

Fig. 18 is a diagram showing concentric zones having different K factors;

Fig. 19 is a diagram showing curves of statistical weight plotted against partial radius over entire radius;

Fig. 20 is a diagram showing curves of average K for a reactor having zones of different K factor.

Referring to the drawings, I have chosen to illustrate my invention first by reference to an air cooled graphite uranium reactor, sometimes known as a pile, loaded in accordance with uniformly spaced rod geometry to give a normal peaked activity curve. Then I will describe how the same structure can be loaded to flatten the activity curve.

Figure 1:
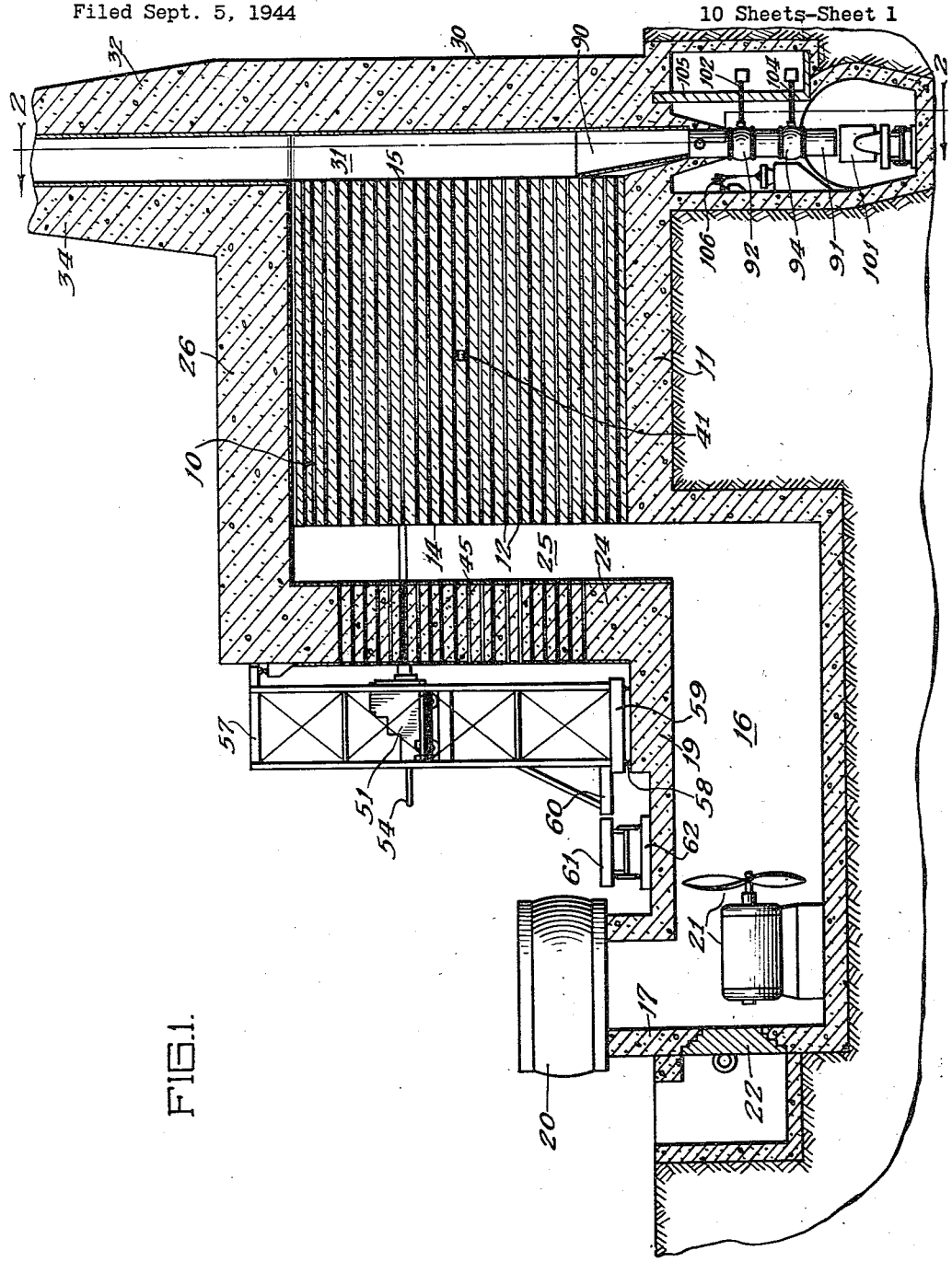
Fig. 1 is a longitudinal view partly in section and partly in elevation of an air cooled neutronic reactor system illustrating my invention.

Such a structure broadly comprises a mass of graphite blocks closely piled or stacked into a cube 10 shown in Figs. 1 and 2. This graphite cube may be, for example, 28 feet on a side and rest on a concrete foundation 11. The graphite cube 10 is pierced with horizontal air channels 12 of square cross-section, with one of the diagonals vertical, as shown in Fig. 6. The channels may be readily made by grooving adjacent blocks. The channels are 1.75 inches on a side and extend completely through the reactor, from an inlet face 14 to an outlet face 15. About 2000 channels may be provided, and as will be later brought out, any unused channels can be plugged. Only a few of the channels are shown in the drawing for sake of clarity.

Adjacent the inlet face 14 of the cube, the foundation is continued downwardly to form the floor of an inlet air duct 16 extending outwardly. The inlet air duct 16 is completed by concrete side walls 17 and top 19.

At some distance away from the graphite cube 10 the inlet duct is turned upwardly to terminate in an air filter 20, relatively close to the surface of the ground. A fan or blower 21, here illustrated as electrically driven, is installed on the floor of the inlet duct just below the air filter, access to the fan being conveniently obtained through duct door 22, behind the fan.

The concrete top 19 of the inlet air duct is continued upwardly as an inlet end shield 24, positioned parallel to but spaced away from inlet face 14 of the cube 10 to form an inlet chamber 25 communicating with the air channels 12.

Above the inlet chamber 25 and the cube 10 the concrete is continued horizontally to form a top shield 26, and side shields 28 are built up from the foundation 11 to enclose cube 10. Shields 26 and 28 closely approach the top and side faces of the cube, to minimize air flow around the outside of the cube. A small amount of air circulation, however, may be desirable over the top and side faces to cool these faces.

At the outlet face 15, an outlet end shield 30 of concrete is provided. End shield 30 is parallel to and spaced from the outlet face 15 of the graphite cube to form an outlet chamber 31 communicating above with the base 32 of a stack 34 projecting upwardly and formed as a continuation of the concrete top, side, and outlet end shields. Thus the cube 10 is completely enclosed by concrete shields, with a duct system operating by virtue of pressure provided by fan 21 to conduct air from close to ground level through channels 12 into the stack and then into the atmosphere well above ground level at the top of the stack. The concrete shields may be from five to ten feet thick in accordance with the maximum desired operating power of the reactor and serve as shields to reduce escape of neutrons and gamma radiation.

As a neutronic reaction will take place when uranium bodies are properly spaced in a moderator mass of a certain finite size, the above-described device can be made chain reacting by placing uranium bodies in the horizontal channels in such a manner and in such an amount that a neutron reproduction ratio of slightly over unity is obtained, exclusive of all neutron losses within the reactor and from the exterior of the reactor.

Using the graphite mass as the moderator to slow fast neutrons to energies where they again are able to create fission in $92^{235}$, the device as described will have a reproduction ratio of unity when approximately 700 of the channels 12 in the graphite cube are each loaded with 68 aluminum jacketed uranium slugs 35 lying end to end, with a channel spacing of 7 inches measured center to center, and with the loaded channels roughly defining a cylindrical active portion as indicated by line A in Fig. 2. Both graphite and uranium should be of highest possible purity.

However, more than a unity reproduction ratio is required, as when the reproduction ratio is exactly unity no rise in neutron density will occur. Under such conditions the device will not develop high neutron densities or power in the form of heat. By loading additional channels, i. e., making the active portion greater than critical size, however, the reproduction ratio within the reactor can be brought above unity in order that a rise in density can occur. Then this excess neutron reproduction can be absorbed by neutron absorbing materials deliberately inserted into the reactor in order to hold the reproduction ratio at an average value of unity after a desired power output has been obtained, as a result of the initial rise in density.

Consequently, in accordance with the amount of excess reproduction ratio desired, about 1000 channels may be loaded with uranium slugs. Most of the channels not loaded with uranium may be closed by inserting plugs, preferably of graphite, in such channels in order to conserve air. Some of the channels, however, in the peripheral portions of the cube may be left open for cooling of the graphite in those portions.

One preferred form of slug construction for rod geometry is shown in Fig. 4. In this case, each slug 35 comprises a uranium metal rod 36, 1.1 inches in diameter and 4 inches long covered with an aluminum jacket 37 approximately 20 mils thick in good heat conductive relation to the uranium. The slugs weigh about 2½ pounds each.

In forming the slugs 35, the uranium portion 36 is machined to size, cleaned in trisodium phosphate and then washed in water. Aluminum or other non-fissionable metal jacket cans 37 are provided having an inside diameter somewhat larger than the uranium portion. This can 37, open at one end only, is slipped over the uranium metal slug after being cleaned in benzine and hot water. The can 37 with the uranium inside is then passed through a sizing die of 1.134 inches diameter. This die, being of smaller diameter than the 1.1 inch uranium portion plus the two 20 millimeter walls, draws the can in tight thermal contact with the uranium.

A cup-shaped cap 38 is then placed base down inside the projecting portion of the can 37 and is seam welded to the can. The projecting portion is then cut off above the seam weld 40 and the remaining projecting portion including the weld, spun over the adjacent end of the slug. Thus each jacket completely encloses and seals the uranium, preventing air or other cooling fluid from corroding the uranium and also preventing fission fragments created by nuclear fission at the surface of the uranium from entering the air stream.

The channels are loaded with uranium until the active portion is over critical size, for example, to a size where the reproduction ratio, with neutron absorbers removed, is about 1.005. This geometry provides, with a channel spacing of about seven inches, a volume ratio of about 47 carbon to 1 uranium and a K factor for the rod lattice of about 1.06. As the K factor of 1.06 is reduced to a reproduction ratio of 1.005 by the reduction in size of the reactor from infinity to the operating size, the reproduction ratio of 1.005 means that for every two hundred neutrons starting in each neutron generation about two hundred and one neutrons can be produced in the operating reactor over and above all losses. Under these conditions and taking into account the fact that about one percent of the neutrons of fission are delayed in their emission for a mean time of about 5 seconds the neutron density of the reactor will double every 8 to 15 seconds. With some part of the neutron absorbers inserted but with the insertion of less than the amount of neutron absorbers required to make the reproduction ratio unity, the rise is slower. When the neutron absorbers are almost, but not entirely inserted, a single doubling of the neutron density may take several hours. When a desired density has been reached, the reproduction ratio can be reduced to unity so that the desired density is continuously maintained by the neutron absorption in the inserted neutron absorbing material.

The neutron absorbing material may be introduced into the reactor in the form of a control rod 41 as shown diagrammatically in Fig. 2. This control rod extends into the graphite cube, sliding in a channel therein and is operated from outside of side shield 28 as by rack and pinion 42. The rod is made from, or incorporates therein, an efficient neutron absorber, such as, for example, cadmium or boron. A sheet of cadmium riveted to a steel strip forms a satisfactory control rod. As the depth of insertion of the rod determines the amount of neutron absorbing material inside the reactor, the critical position of the rod is where the rate of neutron absorption of the rod balances the reproduction ratio at unity. Thus, by moving the rod outwardly from the critical position the neutron density in the reactor will rise. Moving the rod inwardly from the critical position causes the reproduction ratio to fall below unity, and the reaction stops, thus the reaction is always under control, and as the rise in neutron density is exceptionally slow as the rod approaches the critical position, manual control is possible. Other and similar rods may be provided, if desired, for rapid progression into the reactor to stop the reaction in case of failure of the control rod to stop the rise in neutron density for any reason. Such rods are termed safety rods.

During operation heat is released in the reactor in accordance with the neutron density therein. Most of the heat arises from the kinetic energy of the fission fragments and about 92 percent of the energy is released in the uranium. About 6 percent is released in the graphite due to neutron absorption therein and about 2 percent escapes from the reactor in the form of neutrons and gamma radiation. Consequently, the reactor can only be operated at a power dependent upon heat removal to the point where a stable temperature obtains. Otherwise, the reactor will accumulate heat to the point that the device may be damaged. Since aluminum melts at 658° C., stable temperatures below this value should be used although with jackets of other non-fissionable metals, such as beryllium, the stable temperature may be increased, although if the temperature should rise too high the uranium bodies might be damaged even when using beryllium jackets as uranium of the type used in neutronic reactors melts at about 1100° C.

A stable temperature is obtained in the device of the present invention by passing atmospheric air through the reactor, and in the specific example shown and described, the air is passed through the graphite channels and directly in contact with the aluminum jackets of the slugs. Under these circumstances the reactor can be operated continuously at 250 kilowatts electrical equivalent of heat by passing 32,000 cubic feet per minute through the reactor with a maximum temperature of the slugs of about 100° C., and at 500 kilowatts continuously with about 50,000 cubic feet per minute of air with a maximum metal temperature of 200° C. These heat maxima occur at the center of the reactor loaded as described, and total power output is determined by the maximum temperature permitted there. Higher temperature maxima may be used, but what these temperatures will be will depend upon the heat conductivity of the uranium, the jacket and the jacket-uranium interface, and the cooling efficiency.

Having discussed generally the operation of the reactor, and the temperature stabilization thereof by air cooling, I will now describe one means and method by which the reactor can be loaded and unloaded, in order that the neutron irradiated uranium can be removed for processing of irradiated uranium for the recovery of 94$^{239}$ formed and so that fresh uranium can be inserted for subsequent operation of the reactor.

To accomplish loading of the slugs 35 into the various air channels 12, the concrete of the inlet end shield 24 is pierced with a plurality of loading apertures 45, as shown in Figs. 1 and 5, each aperture being aligned with the axis of slug positions in the air channels 12, Normally, during operation of the reactor, each aperture 45 is closed by a removable lead plug 46 extending through the shield 24 only.

When it is desired to load a channel with new slugs, the lead plug 46 for that channel alone is removed, and a charging tube 47 inserted, extending through the inlet end shield 24, across the inlet chamber 25 and entering the corresponding air channel 12 as shown in Fig. 5. The outer end of charging tube 47 is provided with a flanged nipple 49 shaped to engage a nipple recess 50 of a loading mechanism indicated generally by numeral 51. It will be noted that the charging tube is smaller than the air channel 12 and that air can pass through the channel being unloaded. The air should circulate during unloading, although it may be at reduced velocity.

Loading mechanism 51 comprises a loading magazine 52, a loading plunger 54, and a plunger drive 55, as shown in Figs. 7 to 10 inclusive.

The loading mechanism 51 is mounted on an elevator platform 56 mounted to be raised and lowered in an elevator frame 57 capable of moving along the outside of inlet end shield 24 on elevator tracks 58 (Fig. 1). Base 59 of the elevator frame is provided with a platform 60 projecting outwardly on the same level as the top of a supply car 61 travelling on supply car tracks 62. Supply car 61 is used to bring a supply of slugs to the elevator for use in the loading mechanism 51.

Referring again to Figs. 7–10 inclusive, the slugs 35 when received at the elevator, are loaded into an inclined loading channel 64 in the loading magazine 52, in side by side relationship and fed by gravity to the bottom thereof. The bottom of loading channel 64 is a part of a plunger bore 65 extending through the loading magazine ending in the nipple recess 50 cooperating with flanged nipple 49 on charging tube 47 so that the plunger bore 65 and the loading bore in guide tube 47 are in concentric alignment. To provide engagement and disengagement of nipple recess 50 and nipple 49, the entire loading mechanism is movable with respect to elevator platform 56 on wheels 67 running in guides 69 on the elevator platform.

It will be noted that loading magazine 52 is massive. In some instances it may be desirable to load slugs already partially irradiated and in consequence radioactive. The thick walls of the magazine then act as a shield for the radioactive slugs, and in this case a heavy cap 70 may close the upper opening of the loading channel 64. Iron or lead may be used for the body of the magazine. In addition, the use of thick metal in the magazine, particularly around the plunger bore 65, reduces radiation that might pass through the interconnected loading aperture 45 and guide tube 47 either from radioactive slugs therein or from the irradiated slugs in the reactor when charging tube 47 is empty.

The slugs are fed from magazine 52 by a reciprocating motion of plunger 54 operating in plunger bore 65. Plunger 54 may be of iron to act as a shield when inserted into charging tube 47 and is supported outwardly by plunger bearing 71 on the opposite side of a plunger drive 55.

Plunger drive 55 in simplified form, may be a friction wheel 74 driven by motor 75 as shown in Figs. 7, 9 and 11 opposed by an idler wheel 76 pressed against plunger 55 by springs 77. Motor 75 is reversible and under control of the loading operator. Plunger 54 is sectional, having a threaded end 79 (Fig. 9) capable of making connection with additional plunger sections. Sufficient sections are provided to insert the plunger entirely through an air channel 12 when required.

In the initial loading of the graphite cube 10 when uniform loading is performed, loading is started with the more central air channels until 68 slugs have been placed in the guide tube 47 and connected channel. Plunger 54 is then operated to push the slugs into the channel until the outer end of the first slug is at the outlet face 15. The plunger is then withdrawn, leaving the outer end of the last slug about 16 inches from the inlet face 14, for purposes explained later.

Proceeding outwardly and preferably concentrically, additional channels are loaded, meanwhile checking the neutronic activity of the reactor. As the activity increases as the loading approaches a critical size, that is, the size where the reproduction ratio will be exactly unity, the approach to critical size can be predicted by extrapolation of observed neutron density values with respect to the volume of the cube loaded with uranium. The neutron density values can be obtained from an ionization chamber 80 (Fig. 2), for example, using any well known indicating circuit, or by measuring the radioactivity of indium foils, for example, induced by neutron irradiation when inserted into the reactor.

As the critical size is approached, the control rod 41 is inserted deeply into the reactor to prevent a self-sustaining chain reaction; and loading is continued until the desired maximum reproduction ratio of, for example, from 1.005 to 1.006 is attained. This ratio can be checked by removal of the control rod and measuring the time taken by the reactor to double its neutron density. From this period, the reproduction ratio can be mathematically computed.

When the desired number of channels are loaded the active core of the reactor will be ready for operation. Graphite plugs for the unused air channels may be loaded in a manner similar to that described for the uranium slugs.

It will be noted that on 4 sides of the graphite cube excess graphite will be present. On the fifth side, i. e., at the inlet face, graphite will also extend 16 inches beyond the uranium. On the remaining side, i. e., the outlet face, no graphite extends beyond the uranium. Thus 5 sides of the active portion (the uranium bearing portion) are surrounded by graphite. This graphite constitutes a reflector and reduces the amount of uranium required to reach critical size.

Graphite and other neutron moderators can be used around the active portions of a neutronic reactor, as such materials scatter neutrons passing through them and thereby change the direction of the neutrons. Statistically, due to the scattering action, some of the neutrons that otherwise would be lost to the active portion are returned to it, thus reducing exterior loss and thereby reducing critical size. In graphite-uranium reactors having roughly a spherical shape for the active portion there can be a few percent reduction in the radius of the active portion when it is surrounded by a layer of graphite 1½ to 2 feet thick. In the present instance the reduction in size is slightly less, as only 5 sides of the active portion are surrounded with the reflecting layer.

It will be noted that more air channels are originally provided in the graphite cube than are required for the disposition of the uranium containing slugs in the loading pattern described. The manner in which the uranium is disposed in the graphite as pointed out above is known as the geometry of the system. The shape of the active portion however, can be varied. The system, as just described, may be said to have uniformly spaced rod geometry with cylindrical loading, as the end-to-end relationship of the slugs cause them to form, in effect, a long rod of uranium. Further, the use of full length rods in all channels concentrically arranged around the center of the active portion, gives that portion a generally cylindrical shape.

A spherical shape is somewhat more efficient for the active portion than a cylindrical shape, and can be approached if desired by shortening the extent of uranium loading in the channels as the peripheral concentric layers are added, until an approximate sphere is formed. A suitable compromise when horizontal channels are used, is the use of one or more concentric rings of outer channels around a cylindrically loaded central portion, with only half the number of slugs in the outer channels and disposed with the ends of the slug row equally distant from the ends of the fully loaded rows. Other arrangements will be apparent to those skilled in the art to obtain approximately spherical form.

Figure 12:
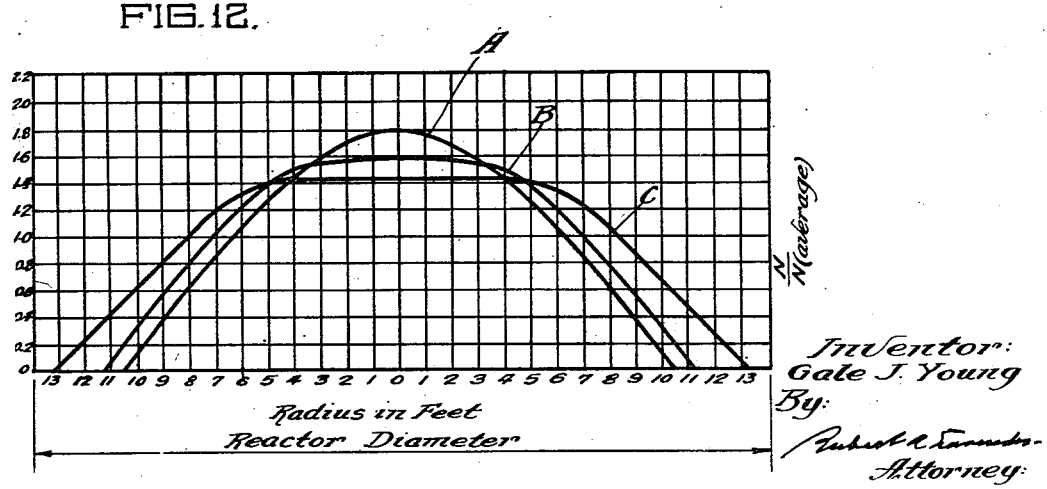
Fig. 12 is a diagram showing the relative neutron densities at different radial distances from the center of the reactor.

As the geometry of the disposition of the uranium in the moderator of the active portion of the reactor is uniform throughout in the loading above described, it follows that the K factor throughout the entire reactor is also uniform (provided all slugs are alike), leading to a reactor activity across the reactor having a distribution curve generally resembling a cosine curve as indicated by curve A in Fig. 12, which is a diagram in which the ratios of local neutron density to the average neutron densities are plotted for different radial distances from the center of the reactor.

Curve A is a centrally peaked curve, indicating that when the maximum slug temperature is set, say at 200° C., the total power at which the reactor can operate is limited by the central reactor activity required to bring the central slugs up to that temperature. I will assume proper cooling, and that the 200° C. temperature is attained at a total power output of 500 kw. It can also be assumed that the uniform geometry used provides a K factor of about 1.06 throughout the reactor to give a self-sustaining chain reaction in the reactor at the size described. Unless the temperature of the central uranium is permitted to rise, assuming maximum cooling, no more power can be obtained from the reactor under these conditions.

However, the lattice in all parts of the reactor and hence the K factor, does not need to be uniform, if the average K factor of the reactor is left sufficiently high that the critical size does not become too large or impractical. I have found that if lattices having K factors that differ in the center of the reactor and in shells or zones surrounding the center are utilized, that when the reactor is assembled with the lattice having the K factor which is lower at the center than at an outer zone thereof, a reactor can be built wherein the reactor activity is no longer peaked, but is flattened across the reactor as shown in curves B and C, Fig. 12. This type of activity distribution may be so adjusted that the neutron reproduction ratio is substantially constant throughout the reactor or a major portion thereof. In such a case for the same total power output, neutron densities around the central slugs and consequently, the slug temperatures, will fall, and the temperatures of the slugs in the intermediate zones will more nearly approach those in the slugs in the center of the reactor. Under these conditions, the total power output of the reactor can then be raised until the more widespread central neutron density is the same as when the activity follows curve A, and the central slugs are at the maximum permissible temperature again. If it is assumed that cooling is uniform throughout the reactor, more slugs than before will then be at or near maximum temperature and the total power output can be greatly increased.

As stated above, the volume ratios of lattices, and hence K factors, can be changed.

In Fig. 17, contour lines have been plotted for lattices of theoretically pure uranium metal rods of a density of approximately 18 grams per cubic centimeter embedded in theoretically pure graphite.

Along the ordinates of the graph are plotted the radii of the rods. Along the abscissae are plotted volume ratios of graphite to uranium. These values give the volume ratio of carbon to uranium for the unit cell that is repeated to form the lattice and for the structure, as any particular lattice geometry is a mere repetition of like cells.

The curves in Fig. 17 have been drawn from a number of observed values of K, and, in addition, from many computed values. The computed values are based on the fact that K is proportional to the product of three factors: $p \times f \times \epsilon$, where $p$ is the probability of a fast fission neutron escaping resonance capture and becoming a thermal neutron; $f$ is the fraction of the thermal neutrons absorbed by uranium (both by simple capture and to produce fission) rather than by the graphite; and $\epsilon$ is a small factor by which the number of neutrons is increased because of additional neutrons due to fission produced by the fast fission neutrons before leaving the lump of uranium. Each of these factors may be computed separately by methods known to physicists, using experimentally determined constants appropriate to these phenomena. The proportionality factor required to obtain K from the product of these three factors has been determined from the measured values of K in certain special cases and also checked by independent experiments. Though K contour lines for natural uranium metal spheres are shown, as representing optimum conditions, the contour lines for short cylinders are approximately the same as for spheres, although the values will be slightly reduced from these shown. The values set forth on the graphs are only accurate within a reasonable margin of error due to the necessity of extrapolation and interpolation of the results obtained by more accurate and actual measurements of lattice arrangements, such as, for example, the results obtained by the measurement of lattice structures too small to support a self-sustaining chain reaction, as set forth in the Fermi application, Serial No. 534,129, filed May 4, 1944. However, if structures are built well within the limits of the curves shown, using materials of a purity presently obtainable, and to the proper critical sizes, a self-sustaining chain reacting system will result.

The highest values for the reproduction factor K are obtained where both the neutron resonance absorption in the uranium and the neutron absorption in the graphite have minimum values. As the uranium bodies are enlarged, for any given volume ratio, surface resonance absorption will decrease but carbon absorption will increase. The increase in carbon absorption in this case is due to the fact that the larger the uranium bodies are, for any given volume ratio, the greater will be the distance between the bodies. The neutrons reduced to thermal energies will then have to diffuse in the carbon over a longer path, thus increasing the probability of capture by carbon, before entering uranium. Likewise, as the size of the uranium bodies is decreased, uranium resonance absorption increases, and in fact, increases faster than the decrease of carbon absorption. Consequently, with all other factors remaining constant, as the size of the uranium bodies and the ratio of the volume of graphite to uranium departs from the optimum, the reproduction factor will decrease in value, as shown in Fig. 17.

It can be seen from the curves of Fig. 17 that if the radii of the uranium rods are less than about 0.25 centimeter the value of the reproduction factor K is less than unity for all volume ratios of graphite to uranium, so that for rod sizes of natural uranium metal less than this value, it would be impossible to build a self-sustaining chain reacting system irrespective of the overall size of the structure. For rods of greater radius than about 0.25 centimeter, it is possible to obtain values for the reproduction factor K greater than unity, providing the ratio between graphite volume and the volume of the uranium is within certain limits shown on the graph. The innermost contour shown in Fig. 17 represents a value for the reproduction factor K of 1.07. At approximately the center of this contour a somewhat higher reproduction factor K for example of about (1.08) may be found. This highest value is for optimum conditions with theoretically pure uranium rods of at least about 1.7 centimeters in radius, and a volume ratio of about 52 carbon to 1 uranium.

When reactors are constructed of concentric layers of varying materials, as shown in Fig. 18, the average K can be calculated.

Curves are shown in Fig. 19 and they are drawn in terms of statistical weight $w_r$ for a particular sub-side (or sub-radius) plotted against $$\frac{r}{R}$$

where R is the side (or radius) of the entire composite active portion of the reactor, and $r$ is the extent of the radius (or side) of the section of the reactor being considered (Fig. 18).

Statistical weight ($w$) may be defined as the value of a given mass of lattice weighted in accordance with its position in the reactor. Any given mass of lattice is more effective at the center of the reactor than at the edges because of the difference in neutron densities at the two positions. In general, it can be said that the effectiveness of a lattice varies in accordance with the square of the neutron density to which it is exposed.

As the neutron density across the reactor varies, $w$ represents the weighted value of a zone evaluated in accordance with the average neutron density across that portion of the radius $r$ through which the zone extends. The curves enable the calculation of the overall K for a reactor consisting of concentric layers of lattices having different K factors. The shapes considered are (1) the cube, (2) the sphere and (3) the cylinder, with the uranium contained in the form of rods as in the present device.

In using the curves, assume a cylindrical active portion of radius R. Then if a material with a reproduction factor $K_1$ and migration length $M_1$ is disposed as a central cylinder of radius $r_1$, a second material of different K, say $K_2$ and migration length $M_2$, is disposed around the central cylinder up to a cylinder of radius $r_2$, and a third material of reproduction factor $K_3$ and migration length $M_3$ is disposed still further out side in a concentric layer up to the edge of the cube where $r_3 = R$; then the average $$\frac{\overline{K-1}}{M^2}$$

is given by:

$$\left(\frac{\overline{K-1}}{M^2}\right) = w\left(\frac{r_1}{R}\right)\frac{K_1-1}{M_1^2} + \left[w\left(\frac{r_2}{R}\right) - w\left(\frac{r_1}{R}\right)\right]\left(\frac{K_2-1}{M_2^2}\right) + \left[w\left(\frac{r_3}{R}\right) - w\left(\frac{r_2}{R}\right)\right]\left(\frac{K_3-1}{M_3^2}\right) \quad (1)$$

In graphite-uranium reactors of the type herein described, the migration lengths can be assumed to be the same for all the concentric zones; in that case $M^2 = M_1^2 = M_2^2 = M_3^2$ and (1) gives the average value of $K-1$ directly, in terms of the separate $K-1$ for each medium.

Migration length (M) as used herein, is proportional to the root means square distance a neutron travels in the reactor from its birth as a fission neutron to its death by thermal absorption. $M^2$ has been found to be from about 650 cm.$^2$ to 750 cm.$^2$ for chain reacting structures of uranium-graphite.

As a specific example of the use of the curves of Fig. 19 as applied, for example to the reactor described herein, when the reactor is cylindrically loaded with rods, if $$\frac{r_1}{R} = 1/2$$

as shown in Fig. 20, when $K_1 = 1.05$ and $K_2 = 1.06$ then $$\overline{K-1} = w\left(\frac{1}{2}\right)(K_1-1) + \left[1 - w\left(\frac{1}{2}\right)\right](K_2-1) \quad (2)$$

Then with both migration lengths taken as being equal, the curves show $$w\left(\frac{1}{2}\right) = 0.525 \quad 1 - w\left(\frac{1}{2}\right) = 0.475$$

hence $$\overline{K-1} = .525 \times .05 + .475 \times .06 = .05475 \quad \overline{K} = 1.0548$$

If $K_1 = 1.04$ and $K_2 = 1.06$, then under the same conditions $\overline{K} = 1.0495$.

The average K for $K_1 = 1.04$ and $K_1 = 1.05$ when $K_2 = 1.06$ is given in curves shown in Fig. 20 with the specific examples given just above noted thereon. It will be obvious that similar curves can be drawn for any desired relation of K factors and concentric radial dispositions thereof. When Formulae 1 or 2 are used for concentric cubical structures, the edge length of the cube can be used for R, with the edge lengths of the inner cubes as $r_1$, $r_2$, etc.

When the average K is found for the structure this value can be used to determine what the critical size of the structure will be.

In the case of a spherical structure employing uranium bodies embedded in graphite in the geometries disclosed herein, and without an external reflector, the following formula gives the critical overall radius in feet:

$$K - 1 = \frac{C}{R^2} \quad (3)$$

where C is a constant which varies slightly with the geometry and for normal graphite lattices is equal to about 7.4.

For a rectangular parallelepiped structure, the critical size can be computed from the following formula:

$$K - 1 = C\left(\frac{1}{a^2} + \frac{1}{b^2} + \frac{1}{c^2}\right) \quad (4)$$

where $a$, $b$, and $c$ are the lengths of the side in feet.

The critical size for a cylindrical structure is given as follows:

$$K - 1 = \frac{C}{h^2} + \frac{4.3}{R^2} \quad (5)$$

where $h$ is the cylinder height in feet and R the radius in feet.

However, when critical size is attained by definition, no rise in neutron density can be expected. It is necessary to increase the size of the structure beyond critical size to a size where the neutron density can rise to a desired operating power. A desirable reproduction ratio for an operating structure with all control absorbers removed is about 1.005. The size at which this reproduction ratio can be obtained may be computed from modifications of the above formulae for critical size. For example, for cylindrical active portions, such as described herein, the radius of the operating portion can be found for example, from the formula $$K - (\text{reproduction ratio desired}) = \frac{C}{h^2} + \frac{4.3}{R^2} \quad (6)$$

The same formula will, of course, give the reproduction ratio for structures where K, $h$, and R are known.

The activity curve across the reactor can be changed by selecting from the family of curves such as shown in Fig. 17, volume ratios of at least two different values to give geometries having different K factors, and then loading the reactor with the geometry giving the lowest K factor, positioned at the center of the reactor. Intermediate zones can contain lattices having K factors progressively increasing in value from the central zone to the peripheral zone, if desired. The required volume ratio values to obtain these K factors can be taken from Fig. 17 and can also be taken for any given K factor, from anywhere on the particular curve shown. In other words, the volume ratio and K factor can be changed either by using the same uranium bodies differently spaced in the moderator, or by using larger or smaller uranium bodies and the same spacing. In the present reactor, the latter method is used, as the spacing is fixed by the moderator structure.

Figure 13:
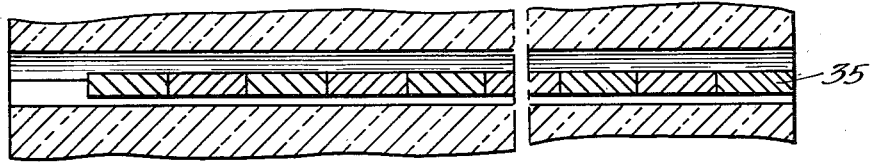
Figure 14:
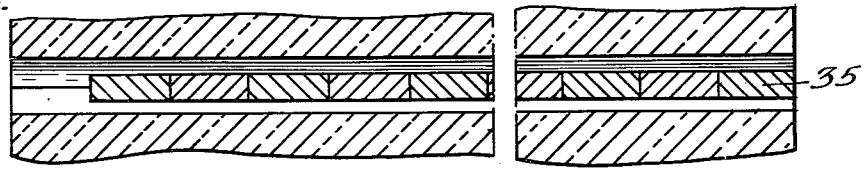
Figure 15:
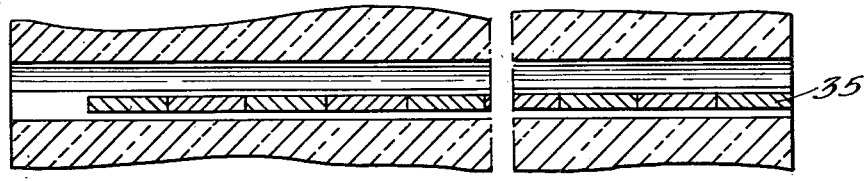

As a specific example, and referring to the diagrams in Figs. 13–16 inclusive, assuming that the entire active portion of the reactor is cylindrically loaded as described above, with uniform rod geometry, and with 1.1 inch diameter slugs, as shown in Fig. 13, the volume ratio, as given above, is about 47 graphite to 1 uranium to give a K of about 1.06. This active portion will then be about 22 feet long and approximately 21 feet in diameter, for operating conditions, i. e., it is somewhat above critical size. This will give a peaked activity curve as shown in curve A, Fig. 12. If then, for example, the central one-half of the reactor is loaded with rod geometry using larger slugs of 1.19 inches diameter as shown in Fig. 14 with a volume ratio of about 40 graphite to 1 uranium, a K factor of about 1.05 for the central zone so loaded will be provided. Leaving the outer one-half of the reactor loaded as previously described to a K factor of 1.06, the average K factor will then be about 1.0548 providing a flattened activity curve as shown in curve B, Fig. 12. The same K factor of 1.05 for the central portion of the reactor can also be obtained by loading it with smaller slugs of .724 inch diameter as shown in Fig. 15, with a volume ratio of about 100 graphite to 1 uranium.

As $$\frac{Vc}{Vu}$$

is proportional to $$\frac{1}{ro^2}$$

if the total volume of the moderator and the spacing of the uranium remains the same in the moderator, curve A can be drawn in Fig. 17 intersecting the K factor curves, thus giving the rod radius (or diameter) and volume ratios for any K factor desired. The value $ro$ above referred to is the radius of the uranium rod. If $K=1.04$ is used for the central one-half of the reactor, curve A in Fig. 17 shows that the reactor can be loaded either with rods of about 1.57 centimeters radius or of 0.88 centimeter radius with volume ratios of about 35 C to 1 U and about 115 C to 1 U, respectively, both providing a K factor of 1.04 and, in this case, an average K of 1.0495 as indicated in Fig. 20, giving a still more flattened activity curve, as the one in curve C, Fig. 12.

Where production of $94^{239}$ is an important factor the use of the larger slugs is desirable when obtaining any desired lower K factor in the center of the reactor. More uranium is present, and therefore more uranium will be exposed to the central neutron densities and resonance absorption will be larger, providing a greater yield of $94^{239}$ and other products. Curves similar to A in Fig. 17 can, of course, be plotted for any original fixed spacing.

The discussion just above, of course, applies to reactors where the spacing is fixed. When spacing can be changed, slugs of the same diameter can be used throughout the reactor, with different spacing in the zones of different K factors being provided to obtain the desired K factors and volume ratios. In many cases such change in spacing can be built into the moderator as it is assembled, to give the desired flattened activity curve. With fixed spacing, an advantage is gained that various activity curves can be obtained in the same moderator structure simply by loading the existing channels with slugs properly dimensioned to give the desired K factor in the concentric zones.

In the calculations just above, the presence of the reflector and residual impurities in the lattice materials is ignored. In structures of the type described herein, residual impurities will increase critical and operating sizes, whereas the use of the reflector will reduce these sizes. As a close approximation the formulae and curves given can be used with the assumption that the effects balance out.

Figure 16:
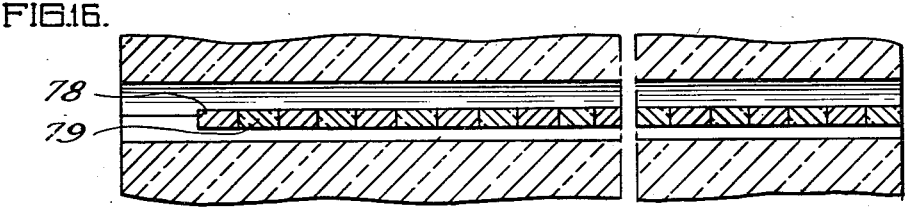

It should be pointed out that other methods can be used for reducing the K factor in the central zone for example, a method known as "stripping" the reactor. This is accomplished by spacing the slugs in the central zone by an amount required to change the volume ratio by an amount lowering the K factor to 1.05 or 1.04 in that zone as desired, for example. This arrangement is is shown in Fig. 16 where half length 1.1 inch slugs 78 are spaced by graphite spacers 79 that can be pushed through the air channels along with the slugs to maintain the mechanical continuity of the slug row. The volume ratio desired cannot, however, in this case be taken from the curves of Fig. 17 as the isolated slugs now approach sphere geometry which is slightly more efficient than rod geometry. Roughly, leaving out every other short slug, and substituting graphite blocks, will provide a K factor of about 1.05. Another mode of stripping would be to remove every other rod in the zone to be stripped. Stripping, however, is subject to the disadvantage mentioned above in that the amount of uranium is reduced and that yield of $94^{239}$ is therefore reduced. However, if economy of use of uranium is desired, either stripping or the use of smaller than normal rods is satisfactory.

Irrespective of the method of loading the central zone to a lower K factor, the reactor, as originally cylindrically loaded with uniform rod geometry had a K factor of 1.06 throughout an operating size for the active portion of about 22 by 20.7 feet, which size, under those conditions was based on that K factor. By reducing the K factor in the central zone, thus reducing the average K, the system would no longer be chain reacting at the same size.

The size of the reactor, therefore, should be increased by adding to its diameter, for example. Consequently enough additional channels are loaded with rod geometry ($K=1.06$) around the periphery of the previous active portion, until the diameter of the new active portion is increased to about 22.25 feet for an average K of 1.0548 or to 26.3 feet for an average K of 1.045. The reactor then is again slightly over critical size for the new average K factors and is chain reacting, with activity curves such as B or C in Fig. 12.

In the examples given above, where uniform rod geometry only is used throughout the reactor, only about 5 tons of the uranium are exposed to neutron densities approaching the maximum whereas, after flattening of the activity curve, as in the other examples described, a much larger tonnage of uranium is exposed to near maximum densities in accordance with the amount of flattening of the curve. Thus the production of $94^{239}$ is larger in the reactor loaded to have the flattened activity curve, than that obtainable (for a predetermined maximum slug temperature) in the reactor loaded to have a normal centrally peaked activity. Thus the permissible total power, the neutron density and the production of the reactor can be very materially increased by the use of my invention.

With the above examples in mind and with the use of lattices built from within the limits of the contours of Fig. 17, those skilled in the art can readily control the flattening of the pile activity by proper design. While the present example has fixed channels horizontally loaded so that the uranium bodies can be changed in spacing along one dimension only of the reactor, it will be obvious that moderator channel structures can be used having lattice spacings that are increased (or decreased) uniformly or in steps from the center outwardly to the periphery of the reactor, and then loaded with uranium sized to provide the desired volume ratio of graphite to uranium, to give the required change in K factor desired and accordingly, to flatten the activity curve across the reactor.

After the reactor is loaded to give the desired shape of activity curve, the fan is started and the control rod is withdrawn until the neutron density rises till a desired power output is attained. The control rod is then progressed into the reactor until a neutron balance is obtained with the reproduction ratio at unity, thus maintaining the chain reaction at the desired operating power. Small variations from the unity reproduction ratio will occur during operation, due to temperature variations of the cooling air, and to change in barometric pressure and to minor variations in air pressure delivered by the fan. However, such variations are compensated by slight inward or outward corrective movements of the control rod, either by hand in response to indicated variations in neutron density, or automatically by direct linkage of the control rod to the output of the ionization chamber 80. However, such automatic control is no part of the present invention.

During operation of the reactor the air passing through the reactor becomes radioactive due to the fact that it is subjected to intense neutron irradiation. For that reason the air passing through the operating reactor is not delivered to the atmosphere at ground level but is exhausted at a substantial distance above ground such as, for example, from the top of a 200 foot stack.

After operation of the reactor for a sufficient length of time for an amount of $94^{239}$ to be created sufficient for chemical separation, such as, for example, 100 days at 500 kilowatts, the reactor is shut down by inserting the control rod fully into the reactor. After about one half hour's wait, during which all delayed neutron emission will have ceased and the more violent radioactivity subsided, the reactor may be unloaded.

The unloading may be accomplished in two ways, either by using the plunger 54 to push the slugs out of the channels so that they fall by gravity out of the outlet face 15, or by using the plunger to insert new slugs in the channels, each slug so inserted pushing an irradiated slug out of the outlet face 15. In the first instance the graphite cube will be left empty after unloading. In the second instance the insertion of new slugs is continued until all or a predetermined part of the irradiated slugs are out of the reactor, having been replaced by fresh material. Thus, the reactor is left ready for the next run. Under ordinary circumstances the latter manner of unloading is preferred.

In either case, the slugs drop by gravity from the outlet face into outlet chamber 31, falling on to two angularly disposed pad plates 90 positioned to intersect the falling slugs, in the bottom half of outlet chamber 31 as shown in Figs. 1 and 2. The two plates slant to a centrally disposed outlet pipe 91 extending downwardly through foundation 11 and provided with spaced valves 92 and 94. The slugs fall by gravity into pipe 91 above valve 92.

Outlet pipe 91 opens into a lower coffin chamber 95 that in turn connects with a tunnel 96 carrying car tracks 97 on which a coffin car 99 may be moved by means of cable 100. Coffin car 99 supports a plurality of slug coffins 101 in position to be successively positioned beneath the lower opening of pipe 91.

Valves 92 and 94 are operated by means of rods 102 and 104, respectively, from behind a heavy lead shield 105, as shown in Fig. 1. A crane 106 is used for placing coffin caps 107 on each coffin after it has been filled with irradiated slugs.

Before unloading is started, both valves 92 and 94 are closed, and the upper portion of pipe 91 is filled with water from water inlet pipe 109. A proper water level is maintained above valve 92 by water outlet pipe 110. The air circulation is maintained, although it may be reduced to about 25 percent of the operating value. Slugs are then pushed out of the reactor to fall on to pad plates 90 and then roll by gravity into the water in the upper part of outlet pipe 91.

In order that there be no material damage to the jacketing of the slugs, plates 90 are preferably padded with a soft material that does not deteriorate under neutron irradiation, and that will be able to withstand the slug impacts. A satisfactory pad has been found to be ¼ inch cotton duck on felt laid on wood backed by steel. Combinations of various synthetic elastic materials have also been found satisfactory.

After a number of slugs have been collected above valve 92 sufficient to fill a coffin 101, unloading is stopped and valve 92 is opened, permitting the slugs and the water around them to drop through the valve and remain in the space between valves 92 and 94. Valve 92 is then closed, the water level reestablished and unloading continued. In the meantime, valve 94 is opened permitting the slugs and water to fall into one of the coffins 101. The car is then moved to register the opening of the next coffin with the end of the outlet pipe and the first coffin is capped. The procedure is continued until all of the irradiated slugs it is desired to remove are in coffins. These coffins may then be taken to a soaking pit (not shown) to remain until the radioactivity has decayed to a point where the slugs can be submitted to chemical treatment for removal of the products formed therein by irradiation. After 100 days' operation the aging period may be about 30 days.

Removal of the irradiated slugs under the conditions specified is performed for two reasons. Firstly, the slugs are so highly radioactive that they cannot be safely approached by personnel without adequate shielding being interposed, and, secondly, for some time after removal from the reactor this radioactivity is so intense that self absorption of the emitted radiations causes self-heating of the slugs sufficient to melt the slugs if not cooled in some manner. By unloading during maintenance of the air stream, by dropping the slugs at once into water, and by keeping the slugs in water until the more violent radioactivity has subsided, melting is prevented, as the slugs are cooled as they boil the water in which they are immersed. The slugs are then stored or aged under water until ready for chemical treatment, as for example, thirty days.

While the flattening or other distortion of the activity curve as herein contemplated has been described primarily with reference to flattening by change of the volume loading of the uranium and graphite or other moderator the same or similar effect may be secured by other means. For example a similar result may be secured by using uranium slugs of different purity in the reactor. Thus it has been found that the presence of impurities, particularly impurities such as boron, cadmium or gadolinium even in quantities as low as 0.01 percent by weight absorb neutrons to an extent such that the K obtainable from uranium containing such impurities may be several hundredths of a K unit. Consequently a localized reduction in K may be secured in this manner.

The amount of impurities present should in no event be so great that the uranium ceases to evolve neutrons or ceases to have a positive K value. Preferably the quantity of impurity should not be so great as to reduce the K of the zone of reactor, in which the impure uranium comprises the reactive isotope, substantially below unity and usually the amount of impurity in the uranium in one section of the reactor should differ from that in another section by an amount only sufficient to establish a small difference for example 0.001 to 0.005 K units between the sections.

In accordance with a further modification different uranium components may be used to effect this result. For example metallic uranium may be used on the outside section of the reactor and uranium dioxide, which has a lower K factor in a central portion. Likewise $D_2O$ or beryllium may be used as a moderator in an exterior zone and a moderator which absorbs neutrons more readily such as graphite located in a central zone if desired. Moreover other loadings may be resorted to in order to distort the activity peak in order to depress it at the center and/or to raise it at an outer point. For example the loading may be such as to cause maximum neutron density to be established at a point other than at the center while yet securing a reactivity curve which is peaked. Numerous other modifications will be apparent within the scope of the invention.

The variation in the K factor over the reactor is preferably controlled within limits so that the overall reproduction ratio ($r$) does not exceed 1.01 or at least does not exceed unity by a fraction greater than the fraction of neutrons produced which are delayed neutrons. It has been observed that while most of the evolved neutrons are liberated almost instantaneously, about one percent of the neutrons are liberated a substantial time after fission for example one to 60 seconds, usually averaging about five or six seconds. By maintaining the reproduction ratio below 1.01 the delay in neutron evolution permits sufficient time for control of the reaction by insertion of cadmium control rods or by other means thus avoiding the possibility of the reaction going out of control within a space of time so short that control rods cannot be inserted.

While the invention has been described with reference and is particularly related to use of natural uranium it is applicable to other mixtures of $U^{238}$ and $U^{235}$ or to other fissionable isotopes which yield neutrons. For example $U^{233}$ or $94^{239}$ may be used in lieu of $U^{235}$. Moreover mixtures of any of these fissionable isotopes with $Th^{232}$ or other isotope which upon neutron absorption ultimately forms such a fissionable isotope may be used in accordance with this invention.

While the theory of the nuclear chain fission mechanism in uranium set forth herein is based on the best presently known experimental evidence, I do not wish to be bound thereby, as additional experimental data later discovered may modify the theory disclosed. Any such modification of theory, however, will in no way affect the results to be obtained in the practice of the invention herein described and claimed.

The term uranium as used in the claim is intended to include uranium in both elemental and combined form unless otherwise specified.

I claim:

An air-cooled neutronic reactor which comprises a moderator of graphite, there being channels extending horizontally entirely therethrough, said channels being spaced 7 inches apart, said channels being square in cross section with one of the diagonals vertical and 1.75 inches on a side, natural uranium rods of one diameter disposed in the channels in a central zone of the reactor, natural uranium rods of another diameter disposed in the channels in an outer zone of the reactor, the diameter of the rods being such that a lower neutron reproduction factor exists in the central zone than in the outer zone the neutron reproduction factor in both zones being greater than one, the diameter of the rods in both central and outer zones being determined by Fig. 17 of the drawing, the intersection of curve A with the curve for the desired K factor for each zone specifying the diameter of rod required to obtain the desired K factor, the neutron density within the reactor thereby being substantially the same throughout a large volume of the reactor so that a more uniform distribution of heat throughout the reactor is obtained than would be obtained if the neutron reproduction factor were uniform throughout the reactor, the purity of the graphite and the uranium and the total mass thereof being sufficient to sustain a chain reaction.

References Cited in the file of this patent

FOREIGN PATENTS

| | | |
|---|---|---|
| 861,390 | France | Oct. 28, 1940 |
| 114,150 | Australia | May 2, 1940 |
| 114,151 | Australia | May 3, 1940 |
| 648,293 | Great Britain | Jan. 3, 1951 |

OTHER REFERENCES

Smyth: "Atomic Energy for Military Purposes," August, 1945.

Kelly et al.: Physical Review 73, 1135–9 (1948).

Rev. Physical Chem. (Japan), vol. 13, 1939.